(12) United States Patent
Niergarth

(10) Patent No.: US 11,505,306 B2
(45) Date of Patent: Nov. 22, 2022

(54) VARIABLE PITCH FAN ASSEMBLY WITH REMOTE COUNTERWEIGHTS

(71) Applicant: General Electric Company, Schenectady, NY (US)

(72) Inventor: Daniel A. Niergarth, Everdale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/222,771

(22) Filed: Apr. 5, 2021

(65) Prior Publication Data

US 2022/0316348 A1 Oct. 6, 2022

(51) Int. Cl.
*B64C 11/32* (2006.01)
*F04D 29/32* (2006.01)
*F01D 7/00* (2006.01)
*B64C 11/34* (2006.01)

(52) U.S. Cl.
CPC ............ *B64C 11/32* (2013.01); *B64C 11/346* (2013.01); *F01D 7/00* (2013.01); *F04D 29/323* (2013.01); *F05D 2220/36* (2013.01); *F05D 2260/74* (2013.01)

(58) Field of Classification Search
CPC . F01D 7/00; F01D 7/02; F04D 29/323; B64C 11/32; B64C 11/325; B64C 11/34; B64C 11/346; F05D 2260/74
See application file for complete search history.

(56) References Cited

U.S. PATENT DOCUMENTS

| | | | | |
|---|---|---|---|---|
| 2,844,303 A | * | 7/1958 | Kristiansen | F04D 29/366 416/168 R |
| 4,111,601 A | * | 9/1978 | Richard | F03D 7/0252 416/DIG. 7 |
| 4,913,623 A | * | 4/1990 | Schilling | B64C 11/346 416/129 |
| 5,152,668 A | * | 10/1992 | Bulman | F01D 7/00 416/129 |
| 5,154,372 A | * | 10/1992 | Hora | F01D 1/24 416/129 |
| 7,244,098 B2 | | 7/2007 | Bromann | |
| 9,017,017 B2 | | 4/2015 | Sausse et al. | |
| 9,416,733 B2 | * | 8/2016 | Gallet | F02K 3/072 |
| 9,527,578 B2 | | 12/2016 | Towkan | |
| 9,869,190 B2 | | 1/2018 | Niergarth et al. | |
| 10,036,262 B2 | * | 7/2018 | Tajan | F01D 7/02 |
| 10,899,432 B2 | * | 1/2021 | Charier | F02K 1/66 |

FOREIGN PATENT DOCUMENTS

GB 2 218 747 A 11/1989
WO WO 2012/066240 5/2012

* cited by examiner

*Primary Examiner* — Courtney D Heinle
*Assistant Examiner* — Sang K Kim
(74) *Attorney, Agent, or Firm* — Klarquist Sparkman, LLP

(57) ABSTRACT

A variable pitch fan assembly includes a plurality of rotating trunnion assemblies, a plurality of counterweight assemblies, a first unison ring gear engaged with the trunnion assemblies, and a second unison ring member that restricts out of synch movement of the counterweights relative to each other.

9 Claims, 9 Drawing Sheets

VARIABLE PITCH FAN ASSEMBLY WITH REMOTE COUNTERWEIGHTS

FIELD

The present subject matter relates generally to variable pitch fan assemblies for use with turbomachines and, in particular, to remote counterweight systems for use with such variable pitch fan assemblies.

BACKGROUND

Turbomachine engines for turbofans and turboprops operate on the principle that a central gas turbine core drives thrust-generating airfoil elements, such as propellers or fan blades. In certain turbofan engines, variable pitch fan assemblies allow the angle of incidence, or pitch angle, of the airfoil elements to be varied relative to the rotating hub carrying the airfoil elements. Because engine designs for turbomachines require highly-efficient and reliable operation, improvements in efficiency and reliability of these engines and their components, including variable pitch fan assemblies, are desirable.

SUMMARY

Aspects and advantages of the invention will be set forth in part in the following description, or may be obvious from the description, or may be learned through practice of the technology disclosed in the description.

Various turbomachine engines and variable pitch fan assemblies are described herein. In some embodiments, the variable pitch fan assembly comprises a plurality of trunnions and a plurality of counterweight assemblies. The counterweight assemblies can comprise a counterweight, a counterweight shaft, and one or more counterweight gears. One or more unison ring members can engage the one or more counterweight gears.

These and other features, aspects and advantages of the present disclosure will become better understood with reference to the following description and appended claims. The accompanying drawings, which are incorporated in and constitute a part of this specification, illustrate embodiments of the disclosed technology and, together with the description, serve to explain the principles of the disclosure.

BRIEF DESCRIPTION OF THE DRAWINGS

A full and enabling disclosure of the present invention directed to one of ordinary skill in the art, is set forth in the specification, which makes reference to the appended figures, in which.

DETAILED DESCRIPTION

Figure 1:
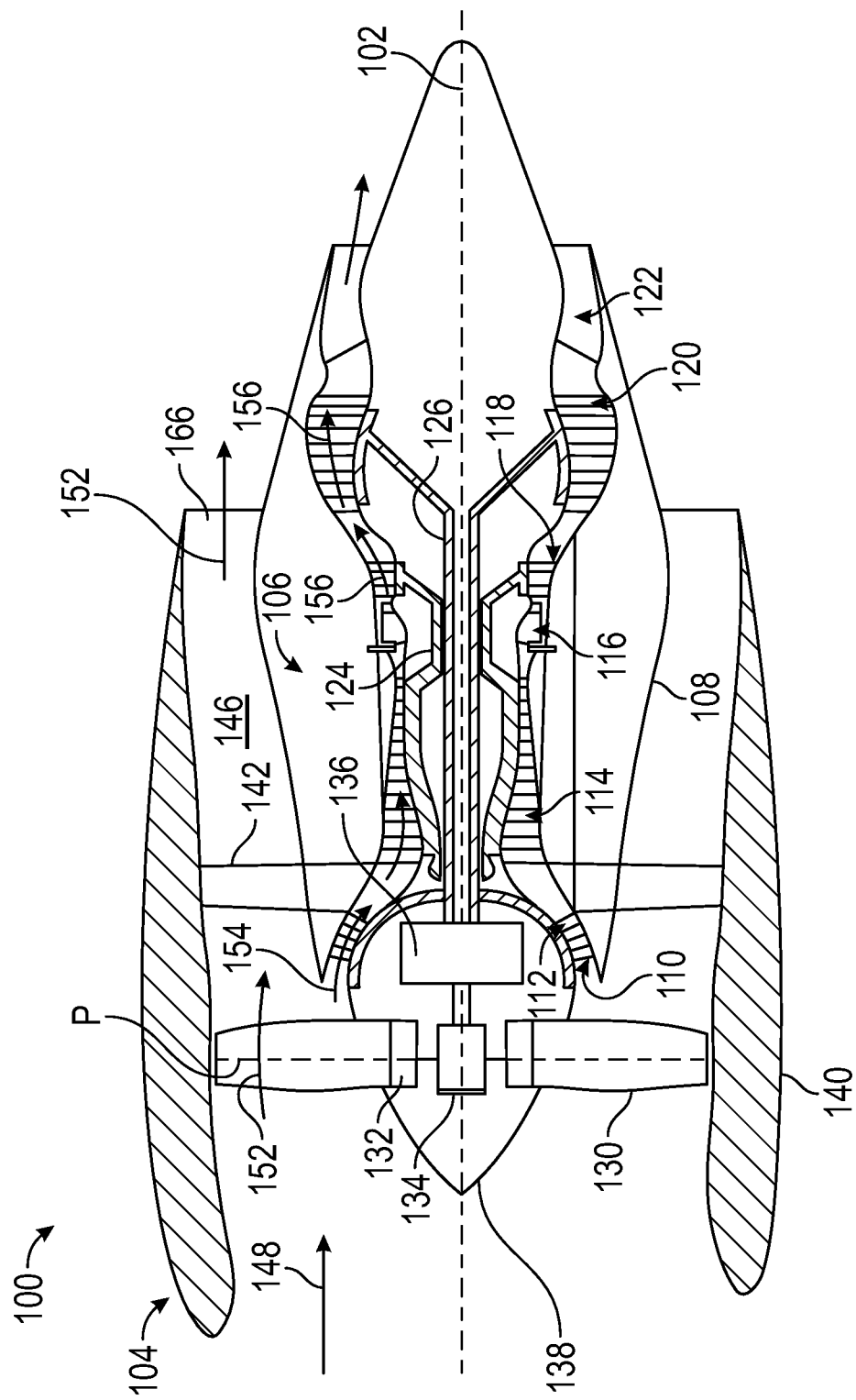
FIG. 1 is a cross-sectional schematic illustration of an exemplary embodiment of a gas turbine engine of an aircraft.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 depicts a cross-section view of an exemplary turbine aircraft engine 100 according to one embodiment suitable for use with the variable pitch fan systems disclosed herein. FIG. 1 shows a high-bypass turbofan jet engine 100; however, it should be understood that the systems disclosed herein can be used with other turbine engines, such as turboprops and unducted turbofans.

As shown in FIG. 1, the turbofan engine 100 defines an axial direction parallel to a longitudinal centerline 102 and a radial direction extending perpendicular to the axial direction. In general, the turbofan 100 includes a fan section 104 and a core engine 106 disposed downstream from the fan section 104. The engine 100 also includes a gear assembly or power gear box 136 having a plurality of gears for coupling a gas turbine shaft to a fan shaft. The position of the power gear box 136 is not limited to that as shown in the exemplary embodiment of turbofan 100. For example, the position of the power gear box 136 may vary along the axial direction.

The exemplary core engine 106 depicted generally includes a substantially tubular outer casing 108 that defines an annular inlet 110. The outer casing 108 encases, in serial flow relationship, a compressor section including a booster or low-pressure (LP) compressor 112 and a high-pressure (HP) compressor 114; a combustion section 116; a turbine section including a high-pressure (HP) turbine 118 and a low-pressure (LP) turbine 120; and a jet exhaust nozzle section 122. A high-pressure (HP) shaft or spool 124 drivingly connects the HP turbine 118 to the HP compressor 114. A low-pressure (LP) shaft or spool 126 drivingly connects the LP turbine 120 to the LP compressor 112. Additionally, the compressor section, combustion section 116, and turbine section together define at least in part a core air flowpath extending therethrough.

Referring still to the exemplary embodiment of FIG. 1, the disk 132 is covered by rotatable front nacelle 138 aerodynamically contoured to promote an airflow through the plurality of fan blades 130. Additionally, the exemplary fan section 104 includes an annular fan casing or outer nacelle 140 that circumferentially surrounds the fan blades 130 and/or at least a portion of the core engine 106. The nacelle 140 is, for the embodiment depicted, supported relative to the core engine 106 by a plurality of circumferentially-spaced outlet guide vanes 142. Additionally, a downstream section of the nacelle 140 extends over an outer portion of the core engine 106 so as to define a bypass airflow passage 146 therebetween.

During operation of the turbofan engine 100, a volume of air 148 enters the turbofan 100 through an associated inlet of the nacelle 140 and/or fan section 104. As the volume of air 148 passes across the fan blades 130, a first portion of the air 152 is directed or routed into the bypass airflow passage 146 and a second portion of the air 154 is directed or routed into the LP compressor 112. The ratio between the first portion of air 152 and the second portion of air 154 is commonly known as a bypass ratio. The pressure of the second portion of air 154 is then increased as it is routed through the high-pressure (HP) compressor 114 and into the combustion section 116, where it is mixed with fuel and burned to provide combustion gases 156.

The combustion gases 156 are routed through the HP turbine 118 where a portion of thermal and/or kinetic energy from the combustion gases 156 is extracted via sequential stages of HP turbine stator vanes that are coupled to the outer casing 108 and HP turbine rotor blades that are coupled to the HP shaft or spool, thus causing the HP shaft or spool to rotate, thereby supporting operation of the HP compressor 114. The combustion gases 156 are then routed through the LP turbine 120 where a second portion of thermal and kinetic energy is extracted from the combustion gases 156 via sequential stages of LP turbine stator vanes that are coupled to the outer casing and LP turbine rotor blades that are coupled to the LP shaft or spool, thus causing the LP shaft or spool to rotate, thereby supporting operation of the LP compressor 112 and/or rotation of the fan blades 130.

The combustion gases 156 are subsequently routed through the jet exhaust nozzle section 122 of the core engine 106 to provide propulsive thrust. Simultaneously, the pressure of the first portion of air 152 is substantially increased as the first portion of air 152 is routed through the bypass airflow passage 146 before it is exhausted from a fan nozzle exhaust section 166 of the turbofan 100, also providing propulsive thrust. The HP turbine 118, the LP turbine 120, and the jet exhaust nozzle section 122 at least partially define a hot gas path for routing the combustion gases 156 through the core engine 106.

As shown in FIG. 1, the fan section 104 includes a variable pitch fan having a plurality of fan blades coupled to a disk 132 in a spaced-apart manner. As depicted, the fan blades 130 extend outwardly from disk 132 generally along the radial direction. Each fan blade 130 is rotatable relative to the disk 132 about a pitch axis P by virtue of the fan blades 130 being operatively coupled to a suitable actuation member 134 configured to collectively vary the pitch of the fan blades 130. The fan blades 130, disk 132, and actuation member 134 are together rotatable about the longitudinal axis 102 by LP shaft 126, either directly or through a gear assembly, such as gear assembly 136, which enables a speed change between a first shaft, e.g., LP shaft 126, and a second shaft, e.g., LP compressor shaft and/or fan shaft.

Figure 2:
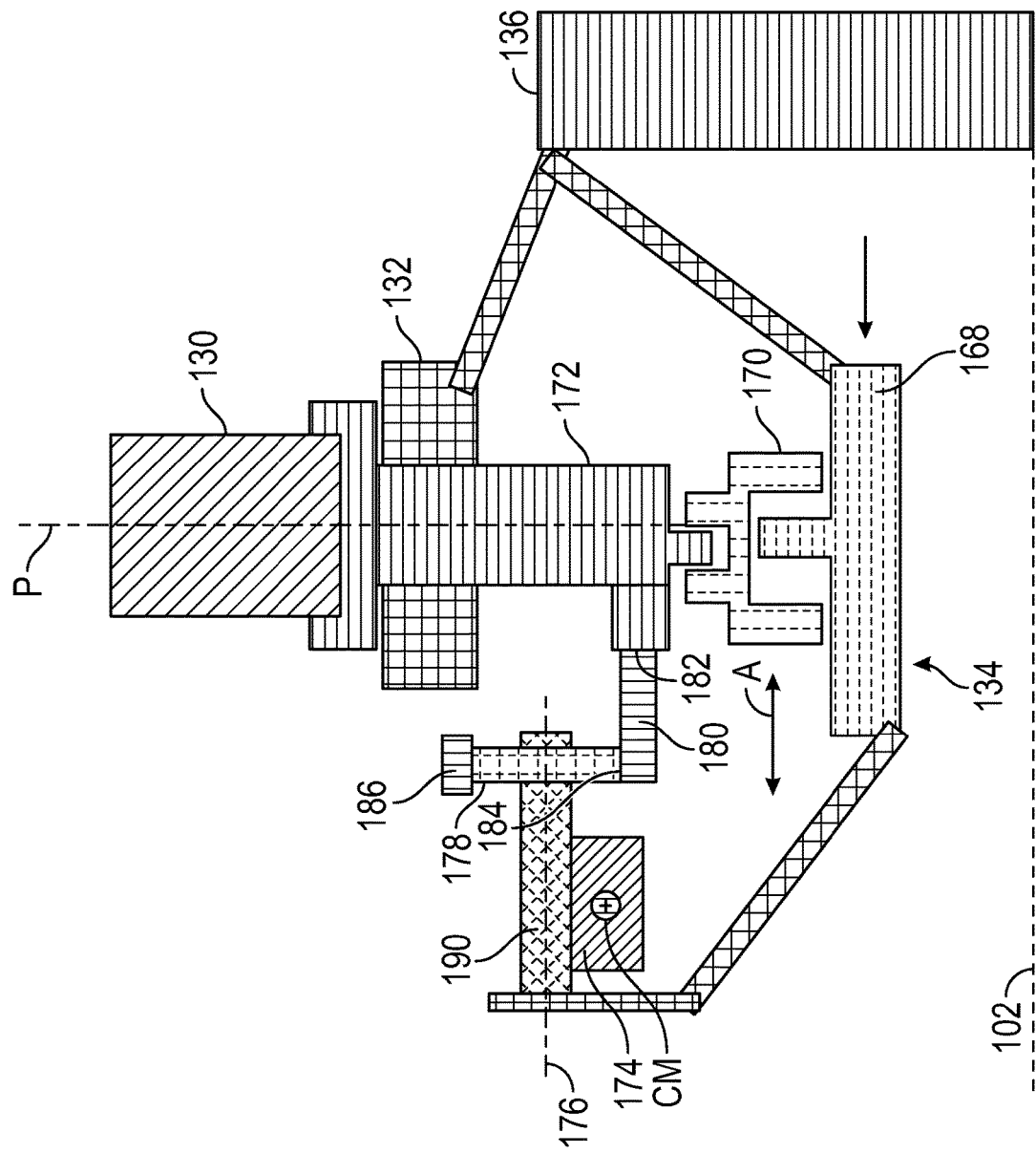
FIG. 2 is a cross-sectional schematic illustration of a portion of an exemplary fan section that includes a pitch change mechanism and a remote counterweight phase control mechanism.

FIG. 2 illustrates a portion of the fan section that includes a pitch change mechanism and a remote counterweight phase control mechanism. As discussed above, the pitch change mechanism includes an actuation member 134 that engages with a plurality of trunnions 172, which are each configured to retain a respective fan blade. The movement of the trunnions 172 varies the pitch of the associated fan blades.

The actuation member 134 can be any type of suitable actuator, including any electrical, mechanical, and/or hydraulic device. The actuation member 134 may operate to provide rotary motion directly, or a linear actuator may be used with an appropriate mechanism to covert its motion to a rotary output. For example, the actuation member 134 illustrated in FIG. 2 can be a linear actuator that varies the pitch of the fan blades 130 by sliding forward and aft, in the axial direction A, to cause the fan blades to rotate, collectively, about the pitch axis P. Actuation member 134 can have a stationary portion 168 and a moving portion 170 that can move relative to the stationary portion 168 when forces (e.g., through hydraulic fluid) are applied to the moving portion 170.

As shown in FIGS. 2-5, a plurality of counterweights 174 can be axially spaced apart from the trunnions 172 to counter the centrifugal twisting moment of the fan blades. Counterweights 174 can be any high-density mass that can rotate about a counterweight (CW) centerline 176. Counterweights 174 can have offset masses that are movable relative to the CW centerline 176. In other words, the center of mass (CM) of each counterweight 174 is not coaxial with the CW centerline. It should be understood that the offset masses can take any suitable shape. For example, in some embodiments the offset mass can be formed from a mass, such as a spherical or other suitably shaped mass, positioned at the end of a rod.

Figure 3:
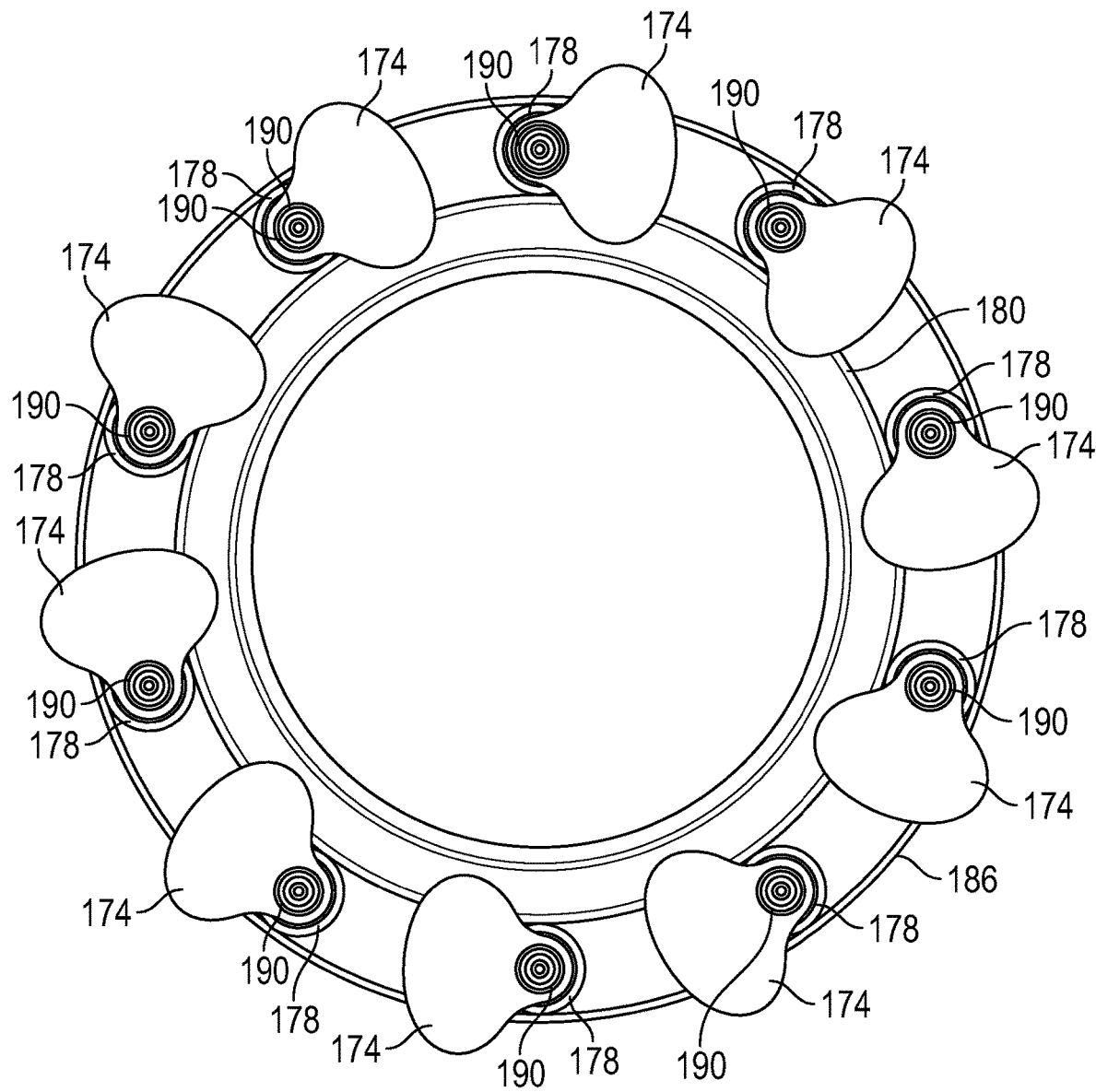
FIG. 3 is a front view of a portion of the pitch change and a remote counterweight phase control mechanisms shown in FIG. 2.

FIG. 3 illustrates a forward view of portions of an exemplary remote counterweight phase control system. As shown in FIG. 3, a respective counterweight 174 is associated with each trunnion 172.

Referring again to FIG. 2, each counterweight 174 can include a counterweight (CW) gear 178 that engages with a respective trunnion 172 via a first unison ring gear 180. As the trunnion 172 rotates, a first gear mesh 182 between a surface of the trunnion 172 and the first unison ring gear 180 causes the first unison ring gear 180 to engage with and rotate the CW gear 178 via a second gear mesh therebetween 184. As the CW gears 178 rotate, the counterweights 174 associated with the CW gears 178 also rotate, thereby varying the position of the counterweights relative to the CW centerline 176.

Figure 4:
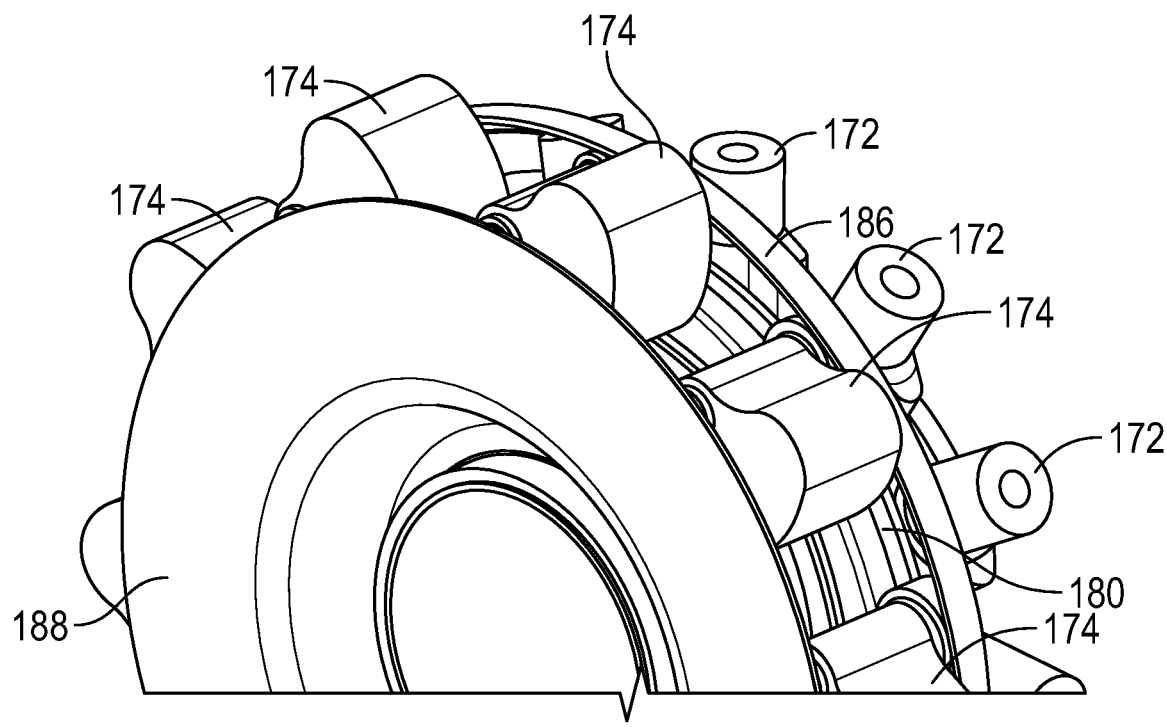
FIG. 4 is perspective view of a portion of the pitch change and a remote counterweight phase control mechanisms shown in FIG. 2.

In FIG. 2, a second unison ring gear 186 is provided radially outward from the CW gear 178 for improved safety and reliability. As shown in FIGS. 3 and 4, for example, second unison ring gear 186 is an external ring gear that extends around all of the CW gears 178, and engages with the CW gears 178 to provide a redundant feature to ensure that the phase of the counterweights remain in synch.

In some embodiments, the second unison ring gear 186 is not driven or load carrying. Thus, during normal operation it will simply move along with the assembly. However, if there is a gear failure or one counterweight otherwise loses connection to the designed load path, the second unison ring gear 186 can react to the load from that counterweight and prevent it from moving out of phase with the rest of the counterweights.

FIG. 3 illustrates a forward view of the plurality of counterweights 174, with the trunnions and related structure removed for clarity. As shown in FIG. 3, the first unison ring gear 180 and second unison ring gear 186 both engage with the CW gears 178 of respective counterweights 174. The first unison ring gear 180 is an internal ring gear with outer gear surfaces that engage with outer gear surface of the CW gears 178 and the second unison ring gear 186 is an outer ring gear with internal gear surfaces that also engage with the outer gear surfaces of the CW gears 178.

Figure 5:
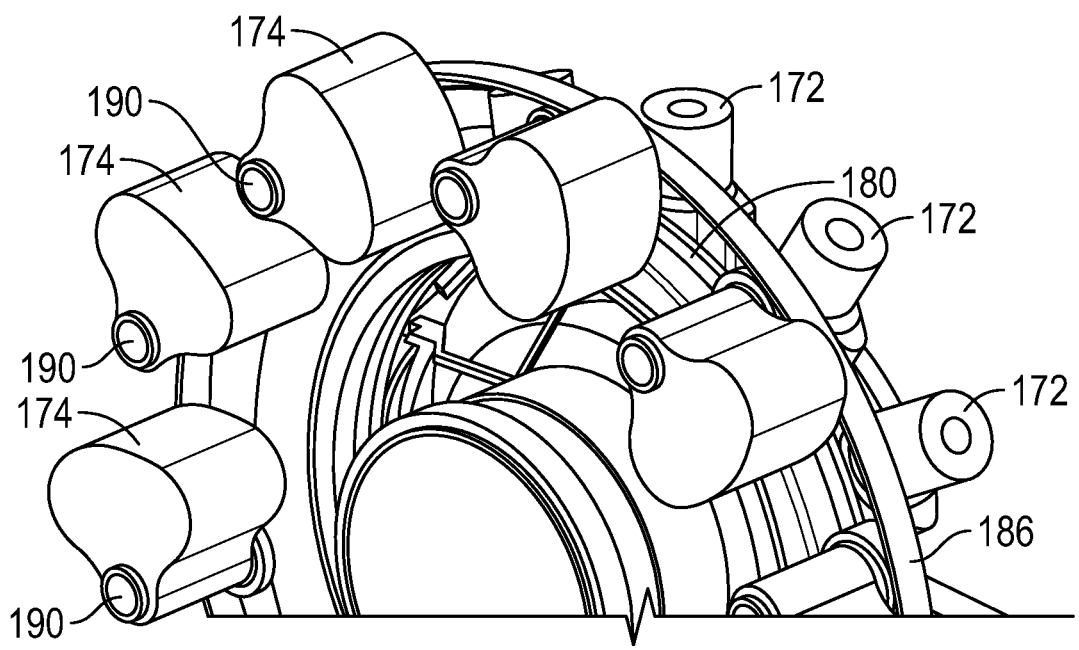
FIG. 5 is another perspective view of a portion of the pitch change and a remote counterweight phase control mechanisms shown in FIG. 2.

FIGS. 4 and 5 are front perspective views of portions of the exemplary remote counterweight phase control system. As shown in FIG. 4, counterweight mounting fixture 188 engages with counterweight shafts 190 to maintain the axial orientation of the counterweights 172 as they rotate about CW centerline 176. FIG. 5 is the same view as FIG. 4, but with the counterweight mounting fixture 188 removed for clarity. As shown in FIG. 5, in this embodiment the counterweight shafts 190 can be hollow so that respective pins of the counterweight mounting fixture 188 can extend into the shafts 190.

Figure 6:
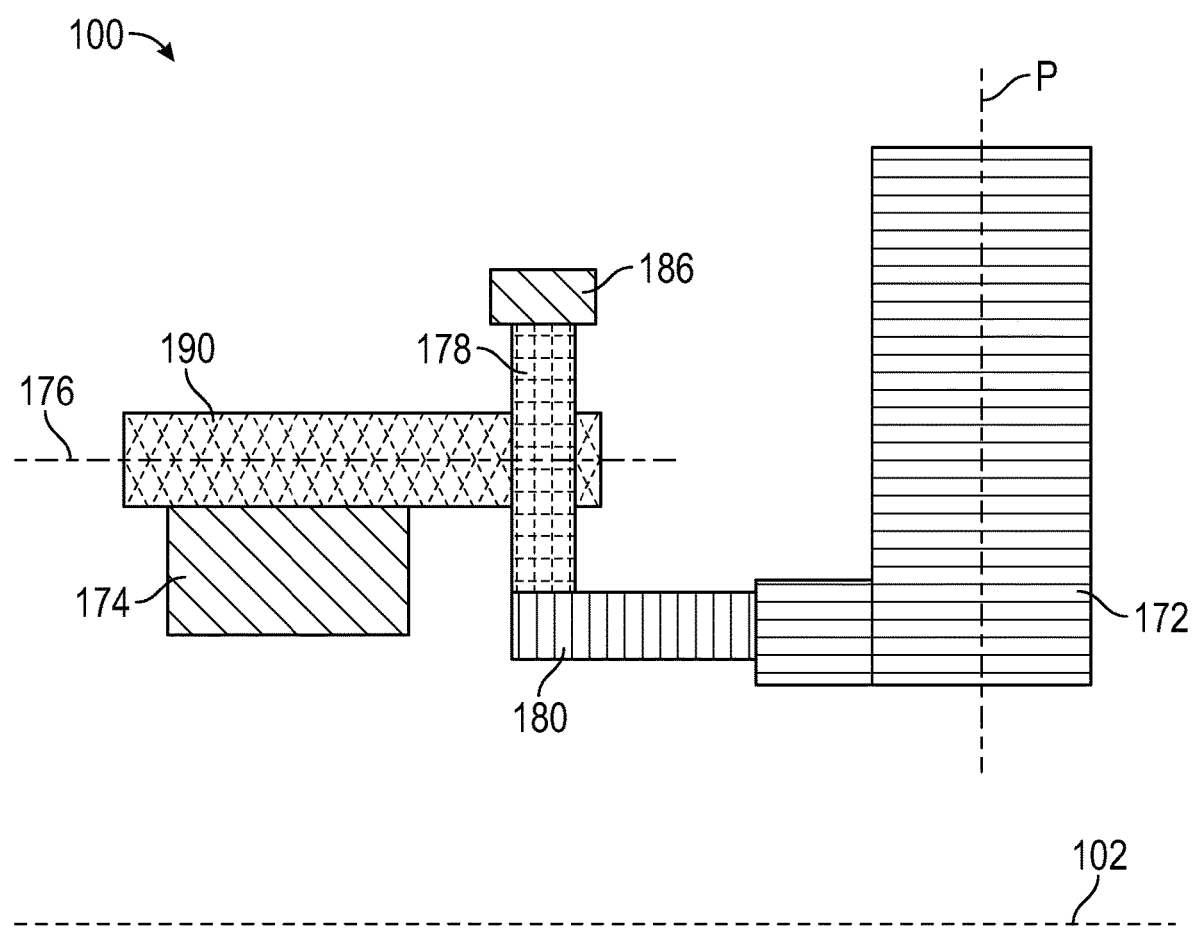
FIG. 6 is a schematic illustration of an exemplary remote counterweight phase control mechanism.

FIG. 6 is a schematic illustration of a remote counterweight phase control system 100, as described above with respect to FIGS. 2-5. As shown in FIG. 6 and discussed above, each trunnion 172 engages with a first unison ring gear 180, which in turn engages with a CW gear 178 to cause a counterweight shaft 190, and its respective counterweight 174, to rotate about the CW centerline 176. Thus, during normal operation, the actuation member causes the trunnions (and associated fan blades) to rotate about the pitch axis P. At the same time, the movement of trunnions causes the first unison ring gear 180 to rotate the respective counterweight 174 to a desired position. In the event of a failure of the actuation member, the counterweights can provide a countervailing force to drive the blades to a desired safe pitch angle.

Figure 7:
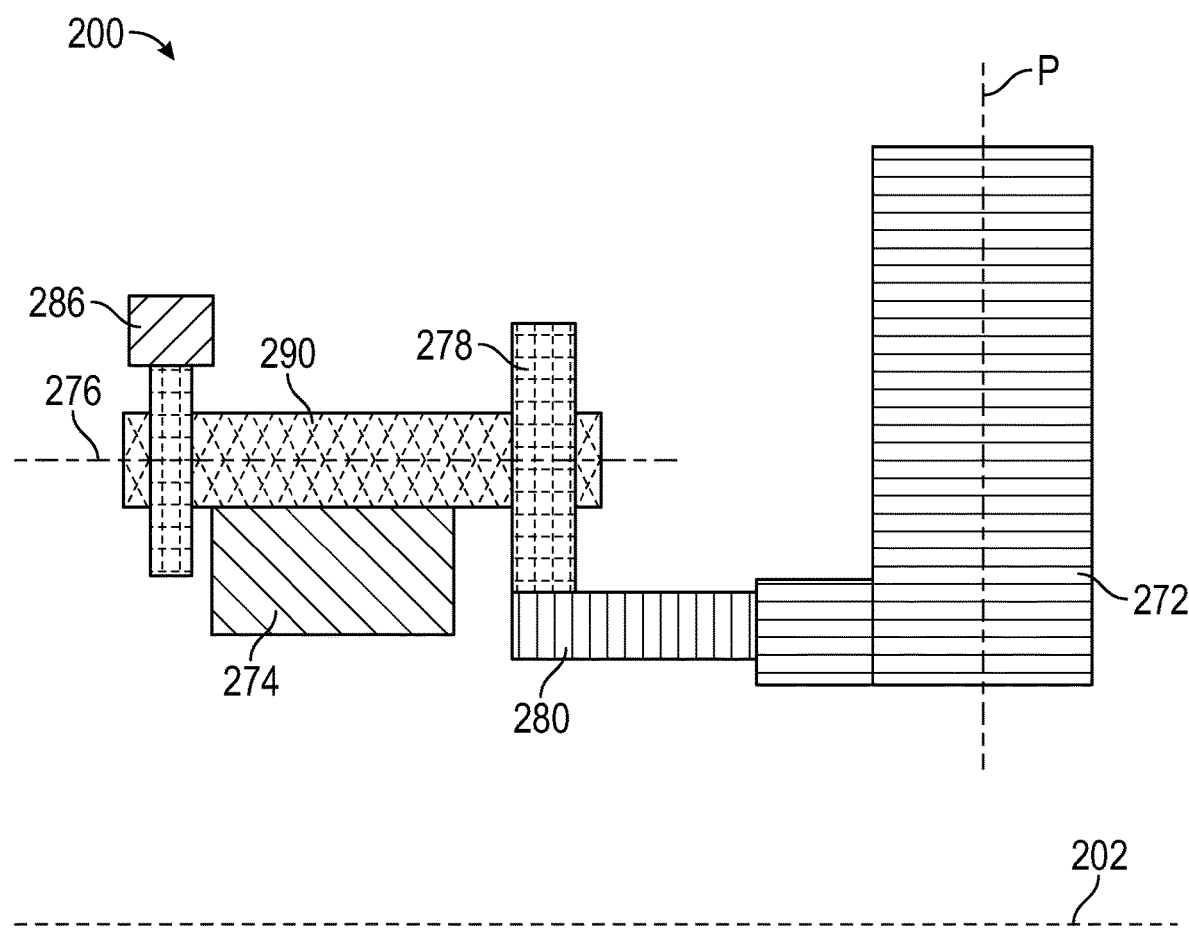
FIG. 7 is another schematic illustration of an exemplary remote counterweight phase control mechanism.

FIG. 7 is a schematic illustration of an alternate embodiment of a remote counterweight phase control system 200. In FIG. 7, each trunnion 272 engages with a first unison ring gear 280, which in turn engages with a CW gear 278 to cause a counterweight shaft 290, and its respective counterweight 274, to rotate about the CW centerline 276. A second unison ring gear 286 is provided forward of the first unison ring gear 280. Thus, instead of being at least partially concentric with the first unison ring gear 280, second unison ring gear 286 is non-overlapping and spaced axially apart from the first unison ring gear 280. To facilitate this arrangement a second, redundant, CW gear 278 is provided at a forward end of counterweight shaft 290. As in the embodiment shown in FIG. 6, the second unison ring gear provides additional safety protections in the event of a gear failure, by ensuring the counterweights 274 remain in phase.

Figure 8:
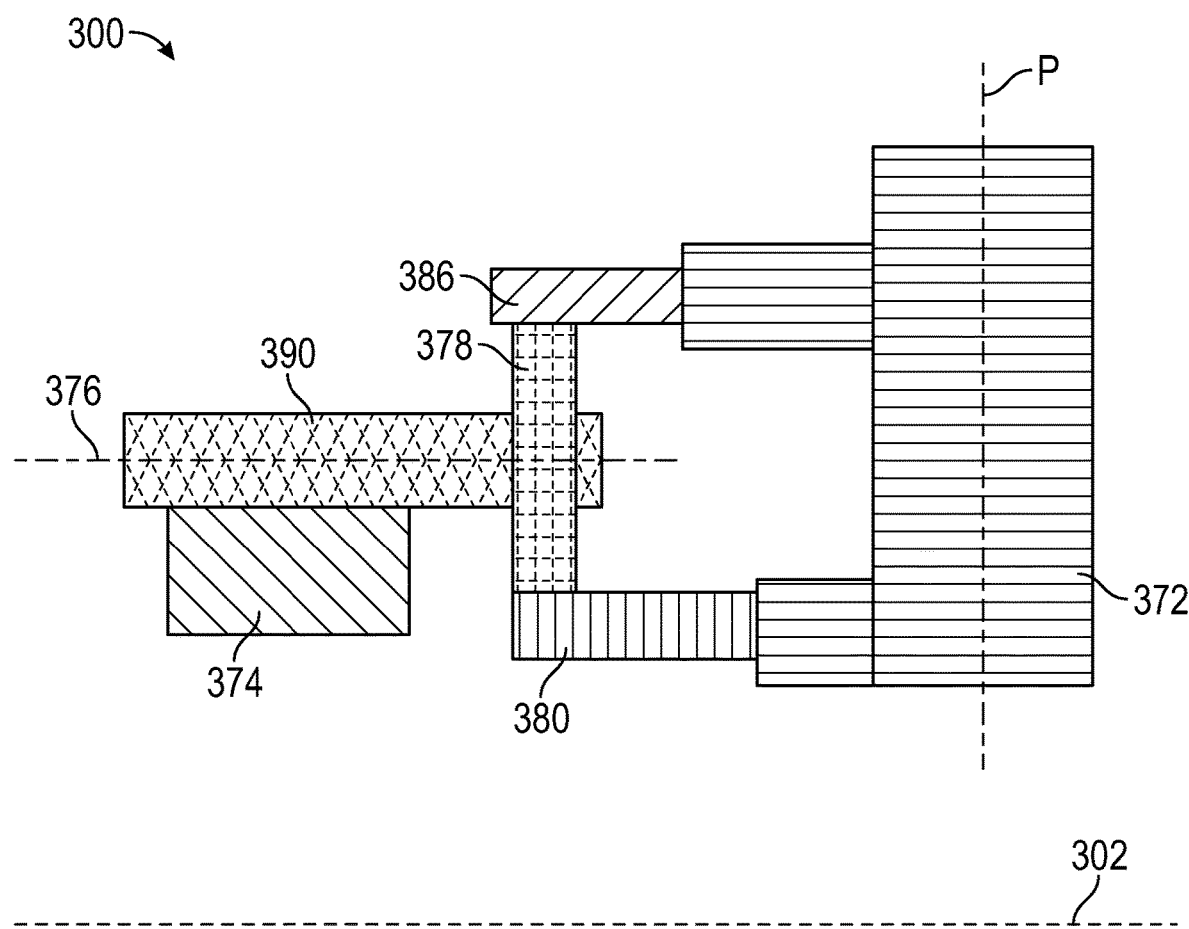
FIG. 8 is another schematic illustration of an exemplary remote counterweight phase control mechanism.

FIG. 8 is a schematic illustration of an alternate embodiment of a remote counterweight phase control system 300. In FIG. 8, each trunnion 372 engages with a first unison ring gear 380, which in turn engages with a CW gear 378 to cause a counterweight shaft 390, and its respective counterweight 374, to rotate about the CW centerline 376. However, in addition, a second unison ring gear 386 is concentric with the first unison ring gear 380. The second unison ring gear 386, like the first unison ring gear 380 has a gear mesh with the trunnion 372. Thus, both the first and second unison ring gears 380, 386 are driving by the trunnion, thereby providing a redundant gear system to provide additional safety protections in the event of a gear failure.

Figure 9:
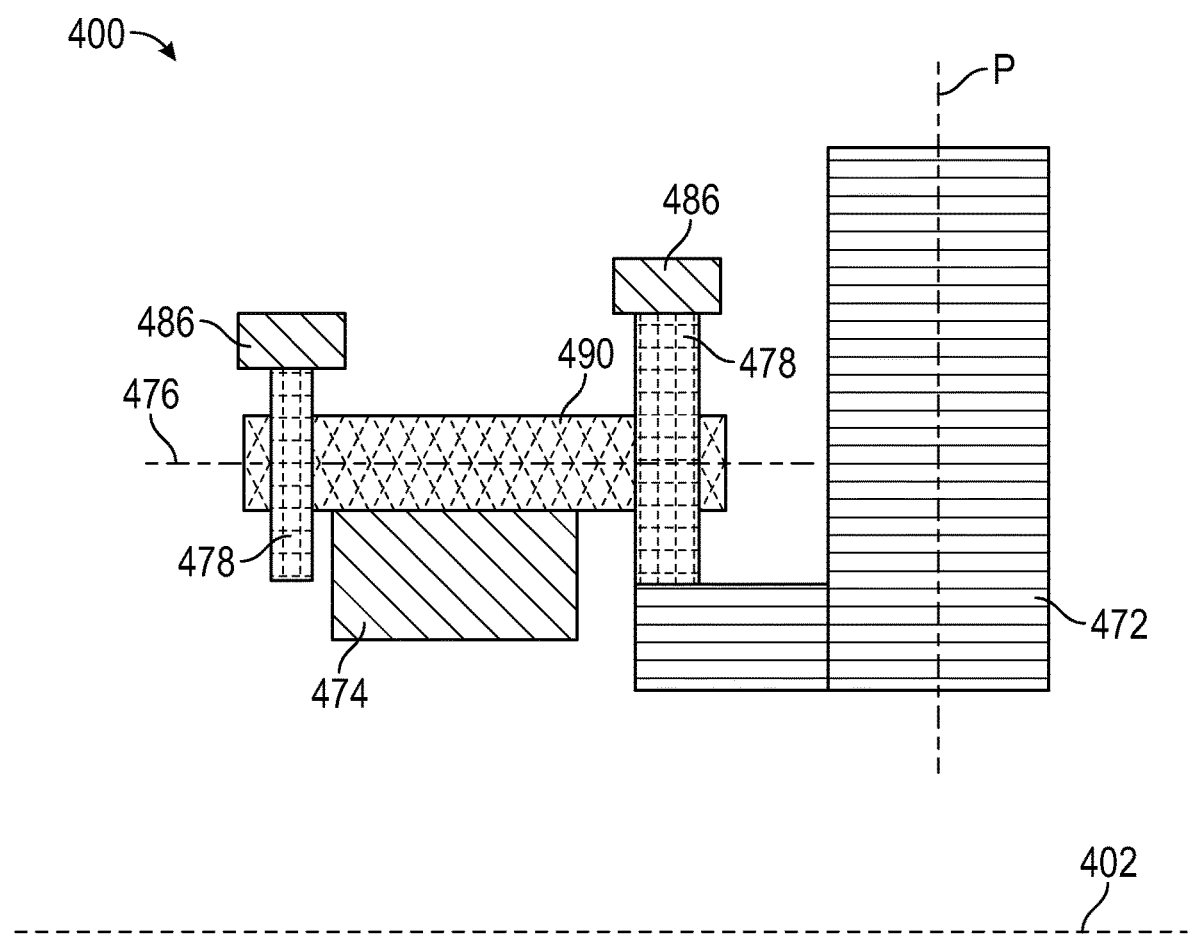
FIG. 9 is another schematic illustration of an exemplary remote counterweight phase control mechanism.

FIG. 9 is a schematic illustration of an alternate embodiment of a remote counterweight phase control system 400. In FIG. 9, a CW gear 478 directly engages with each respective trunnion 472 to cause a counterweight shaft 490, and its respective counterweight 474, to rotate about the CW centerline 476. One or more unison ring gears 486 can be provided to engage with the CW gear 478 or forwardly positioned second CW gear 478. In this embodiment, either one (or both) unison ring gears 486 can be used to provide additional safety protections in the event of a failure, by ensuring the counterweights 474 remain in phase.

Figure 10:
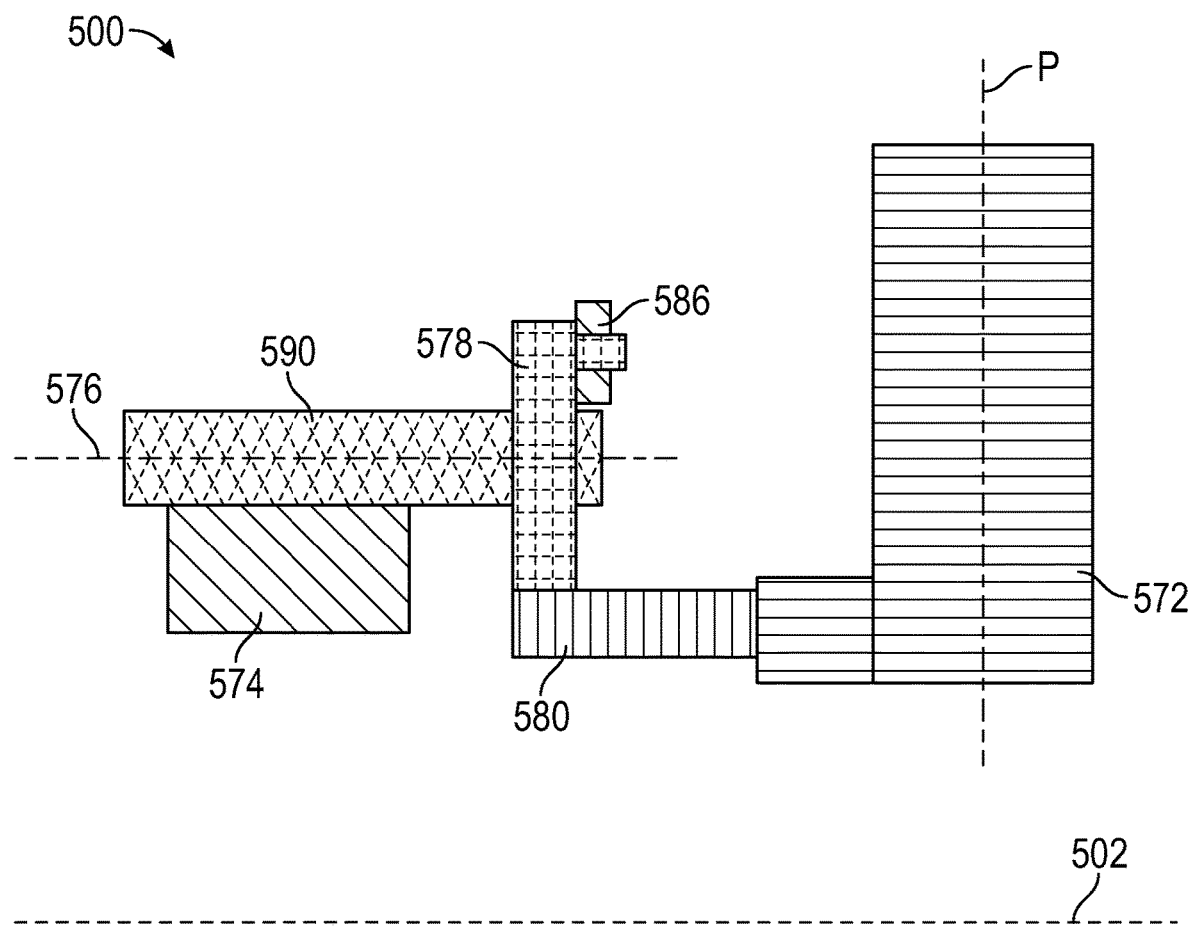
FIG. 10 is another schematic illustration of an exemplary remote counterweight phase control mechanism.

FIG. 10 is a schematic illustration of an alternate embodiment of a remote counterweight phase control system 500. In FIG. 10, each trunnion 572 engages with a first unison ring gear 580, which in turn engages with a CW gear 578 to cause a counterweight shaft 590, and its respective counterweight 574, to rotate about the CW centerline 576. However, in addition, each a second unison ring member 586 can be provided to engage with a pin 591 extending axially from the respective CW gears 578. Thus, instead of a gear mesh, the second unison ring member 586 can facilitate maintaining the phase synch of each counterweight by the mechanical connection of the pins 591 with a respective slot in the second unison ring member 586.

Although certain embodiments described herein may refer to forward or aftward direction, it should be understood that the directions can be reversed. For example, a second unison ring member in the embodiments described herein can be aftward or forward of a first unison ring member, and the associated figures should be interpreted as disclosing either arrangement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A variable pitch fan assembly comprising a plurality of trunnions, each trunnion having a first trunnion gear surface; a plurality of counterweight assemblies each comprising a counterweight, a counterweight shaft, and a first counterweight gear having a first counterweight gear surface; a first unison ring gear with a first gear surface engaged with the first trunnion gear surfaces and a second gear surface engaged with the first counterweight gear surfaces; and a second unison ring gear with a third gear surface engaged with the first counterweight gear surfaces.

2. The variable pitch fan assembly of any preceding clause, wherein the counterweight assemblies each comprise a counterweight centerline about which the counterweights rotate, and a mass of each counterweight is offset relative to the counterweight centerline.

3. The variable pitch fan assembly of any preceding clause, further comprising an actuation member configured to rotate each of the plurality of trunnions about a pitch axis associated with each of the plurality of trunnions.

4. The variable pitch fan assembly of any preceding clause, wherein at least a portion of the second unison ring gear axially overlaps with the first unison ring gear.

5. The variable pitch fan assembly of any preceding clause, wherein the second unison ring gear does not axially overlap with the first unison ring gear.

6. The variable pitch fan assembly of any preceding clause, wherein each of the plurality of counterweight assemblies further comprises a second counterweight gear having a second counterweight gear surface.

7. The variable pitch fan assembly of any preceding clause, wherein the counterweight and first counterweight gear of respective ones of the plurality of counterweight assemblies are fixedly coupled to the respective counterweight shafts, such that rotation of the first counterweight gear causes the counterweights to rotate about their respective counterweight centerlines.

8. The variable pitch fan assembly of any preceding clause, wherein the first counterweight gear and the second counterweight gear of the plurality of counterweight assemblies are fixedly coupled to respective counterweight shafts.

9. The variable pitch fan assembly of any preceding clause, each trunnion has a second trunnion gear surface, wherein the third gear surface of the second unison ring gear engages with the second trunnion gear surface.

10. A variable pitch fan assembly comprising a plurality of trunnions, each trunnion having a first trunnion gear surface; a plurality of counterweight assemblies each comprising a counterweight, a counterweight shaft, and a first counterweight gear having a first counterweight gear surface; and a first unison ring gear with a first gear surface engaged with the first counterweight gear surfaces; wherein the first trunnion gear surfaces are engaged with the first counterweight gear surfaces.

11. The variable pitch fan assembly of any preceding clause, further comprising a second unison ring gear with a second gear surface, and a second counterweight gear associated with each of counterweight assemblies, each of the second counterweight gear having a second counterweight gear surface, wherein the second unison ring gear engages the second counterweight gear surfaces of the second counterweight gears.

12. The variable pitch fan assembly of any preceding clause, further comprising an actuation member configured to rotate each of the plurality of trunnions about a pitch axis associated with each of the plurality of trunnions, wherein the counterweight assemblies each comprise a counterweight centerline about which the counterweights rotate, and a mass of the counterweight is offset relative to the counterweight centerline.

13. A variable pitch fan assembly comprising a plurality of trunnion assemblies, each trunnion having a first trunnion gear surface; an actuation member configured to rotate each of the plurality of trunnions about a pitch axis associated with each of the plurality of trunnions; a plurality of counterweight assemblies each comprising a counterweight that is an offset mass that is rotatable about a counterweight centerline and that is coupled to a first counterweight gear having a first counterweight gear surface, the plurality of counterweight assemblies being configured to move in synch with one another relative to their respective counterweight centerlines; a first unison ring gear with a first gear surface engaged with the first trunnion gear surfaces and a second gear surface engaged with the first counterweight gear surfaces; and a second unison ring member that restricts out of synch movement of the counterweights relative to each other, the second unison ring member extending radially outward from the first unison ring gear.

14. The variable pitch fan assembly of any preceding clause, wherein the second unison ring member comprises a ring gear that at least partly overlaps axially with the first unison ring gear.

15. The variable pitch fan assembly of any preceding clause, wherein the second unison ring member does not axially overlap with the first unison ring gear.

16. The variable pitch fan assembly of any preceding clause, wherein each counterweight gear comprises an axially-extending portion and the second unison ring member comprises a plurality of guiding slots that receive at least a portion of the axially-extending portions of the counterweight gears.

17. The variable pitch fan assembly of any preceding clause, wherein each of the plurality of counterweight assemblies further comprises a second counterweight gear having a second counterweight gear surface.

18. The variable pitch fan assembly of any preceding clause, wherein the counterweights and first counterweight gears are fixedly coupled to a respective counterweight shaft, such that rotation of the first counterweight gear causes the counterweights to rotate about their respective counterweight centerlines.

19. The variable pitch fan assembly of any preceding clause, further comprising a second counterweight gear coupled to each counterweight shaft, wherein the second unison ring member engages with the second counterweight gear to maintain a phase relationship of the counterweights relative to their respective counterweight centerlines.

20. The variable pitch fan assembly of any preceding clause, wherein each trunnion has a second trunnion gear surface, wherein a third gear surface of the second unison ring member engages with the second trunnion gear surface.

I claim:

1. A variable pitch fan assembly comprising:
   a plurality of trunnions, each trunnion having a first trunnion gear surface;
   a plurality of counterweight assemblies each comprising a counterweight, a counterweight shaft, and a first counterweight gear having a first counterweight gear surface;
   a first unison ring gear with a first gear surface engaged with the first trunnion gear surfaces and a second gear surface engaged with the first counterweight gear surfaces; and
   a second unison ring gear with a third gear surface engaged with the first counterweight gear surfaces.

2. The variable pitch fan assembly of claim 1, wherein the counterweight assemblies each comprise a counterweight centerline about which the counterweights rotate, and a mass of each counterweight is offset relative to the counterweight centerline.

3. The variable pitch fan assembly of claim 1, further comprising an actuation member configured to rotate each of the plurality of trunnions about a pitch axis associated with each of the plurality of trunnions.

4. The variable pitch fan assembly of claim 1, wherein at least a portion of the second unison ring gear axially overlaps with the first unison ring gear.

5. The variable pitch fan assembly of claim 2, wherein the counterweight and first counterweight gear of respective ones of the plurality of counterweight assemblies are fixedly coupled to the respective counterweight shafts, such that rotation of the first counterweight gear causes the counterweights to rotate about their respective counterweight centerlines.

6. A variable pitch fan assembly comprising:
   a plurality of trunnion assemblies, each trunnion having a first trunnion gear surface;
   an actuation member configured to rotate each of the plurality of trunnions about a pitch axis associated with each of the plurality of trunnions;
   a plurality of counterweight assemblies each comprising a counterweight that is an offset mass that is rotatable about a counterweight centerline and that is coupled to a first counterweight gear having a first counterweight gear surface, the plurality of counterweight assemblies being configured to move in synch with one another relative to their respective counterweight centerlines;
   a first unison ring gear with a first gear surface engaged with the first trunnion gear surfaces and a second gear surface engaged with the first counterweight gear surfaces; and
   a second unison ring member that restricts out of synch movement of the counterweights relative to each other, the second unison ring member extending radially outward from the first unison ring gear.

7. The variable pitch fan assembly of claim 6, wherein the second unison ring member comprises a ring gear that at least partly overlaps axially with the first unison ring gear.

8. The variable pitch fan assembly of claim 6, wherein each counterweight gear comprises an axially-extending portion and the second unison ring member comprises a plurality of guiding slots that receive at least a portion of the axially-extending portions of the counterweight gears.

9. The variable pitch fan assembly of claim 6, wherein the counterweights and first counterweight gears are fixedly coupled to a respective counterweight shaft, such that rotation of the first counterweight gear causes the counterweights to rotate about their respective counterweight centerlines.

* * * * *